(12) United States Patent
Cohen et al.

(10) Patent No.: US 7,827,245 B2
(45) Date of Patent: Nov. 2, 2010

(54) METHODS AND COMPUTER PROGRAM PRODUCTS FOR SECURING DISPLAY OF MESSAGE CONTENT

(75) Inventors: Gabriel A. Cohen, San Mateo, CA (US); Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 11/682,486

(22) Filed: Mar. 6, 2007

(65) Prior Publication Data

US 2008/0222735 A1  Sep. 11, 2008

(51) Int. Cl.
    *G06F 15/16* (2006.01)
(52) U.S. Cl. .................. 709/206; 709/223; 370/467; 713/170
(58) Field of Classification Search ........... 709/206, 709/223; 370/467; 713/170
    See application file for complete search history.

(56) References Cited

U.S. PATENT DOCUMENTS

| | | | |
|---|---|---|---|
| 4,859,994 A | | 8/1989 | Zola et al. |
| 5,537,476 A | | 7/1996 | Coteus et al. |
| 5,614,920 A | | 3/1997 | Coteus et al. |
| 5,619,219 A | | 4/1997 | Coteus et al. |
| 5,699,427 A | * | 12/1997 | Chow et al. .................... 705/58 |
| 5,761,204 A | * | 6/1998 | Grob et al. .................. 370/467 |
| 6,094,483 A | | 7/2000 | Fridrich et al. |
| 6,314,519 B1 | * | 11/2001 | Davis et al. .................... 726/4 |
| 6,778,989 B2 | * | 8/2004 | Bates et al. .................... 707/10 |
| 6,829,631 B1 | * | 12/2004 | Forman et al. .............. 709/202 |
| 6,839,737 B1 | | 1/2005 | Friskel |
| 7,032,007 B2 | | 4/2006 | Fellenstein et al. |
| 7,069,483 B2 | * | 6/2006 | Gillies et al. ................. 714/712 |
| 7,107,447 B2 | | 9/2006 | Sanin et al. |
| 7,117,182 B2 | | 10/2006 | Chess et al. |
| 7,120,672 B1 | | 10/2006 | Szeto et al. |

(Continued)

FOREIGN PATENT DOCUMENTS

WO        00/49521        8/2000

(Continued)

OTHER PUBLICATIONS

"Sending email secret messages to the blind copy recipient"; Author(s): IBM TDB ; IP.com No. IPCOM000013252D; Original Publication Date: Mar. 1, 2000; IP.com Electronic Publication: Jun. 18, 2003.

(Continued)

*Primary Examiner*—Tammy T Nguyen
(74) *Attorney, Agent, or Firm*—Cantor Colburn LLP; Robert Straight

(57) ABSTRACT

The shortcomings of the prior art are overcome and additional advantages are provided by securing display of sensitive messages to prevent third parties from viewing sensitive content. For one or more incoming messages designated as sensitive, substitute content to be displayed in place of sensitive content is received from a message recipient. Alternatively or additionally, an indicia to be displayed with any incoming message designated as sensitive is received from the message recipient. A message having sensitive content is designated as sensitive by a sender, a recipient, or an intermediate system. Upon receipt of a message designated as sensitive, a message window is displayed that includes substitute content different from the sensitive content. The substitute content includes an indicia that the sensitive content is not displayed.

14 Claims, 3 Drawing Sheets

U.S. PATENT DOCUMENTS

| | | | |
|---|---|---|---|
| 7,131,003 B2 | 10/2006 | Lord et al. | |
| 7,146,009 B2 | 12/2006 | Andivahis et al. | |
| 7,155,243 B2 | 12/2006 | Baldwin et al. | |
| 7,181,017 B1 | 2/2007 | Nagel et al. | |
| 2003/0023695 A1* | 1/2003 | Kobata et al. | 709/206 |
| 2004/0109583 A1 | 6/2004 | Condon et al. | |
| 2004/0201624 A1 | 10/2004 | Crawford | |
| 2005/0114664 A1* | 5/2005 | Davin | 713/170 |
| 2005/0246535 A1 | 11/2005 | Adams et al. | |

OTHER PUBLICATIONS

"Selective Hidden Note Area(s), for any blind carbon copy (bcc:) Recipients and Nested Blind Carbon Copy"; Author (s): IBM TDB; IP.com No. IPCOM000014954D; Original Publication Date: Dec. 6, 2001; IP.com Electronic Publication: Jun. 20, 2003.

"Email with response text"; Author(s): IBM TDB; IP.com No. IPCOM000015248D; Original Publication Date: Dec. 6, 2001; IP.com Electronic Publication: Jun. 20, 2003.

* cited by examiner

METHODS AND COMPUTER PROGRAM PRODUCTS FOR SECURING DISPLAY OF MESSAGE CONTENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates generally to electronic messaging and, more specifically, to methods and computer program products for securing display of instant message and email content to prevent third parties from viewing sensitive content.

2. Description of Background

Various software programs exist for providing electronic messaging functionality. For example, in response to an incoming instant message, an Internet browser may cause a pop-up window to appear on a recipient's computer screen. The pop-up generally displays all or a portion of the contents of an instant message. From time to time, the recipient may receive a sensitive or private instant message while away from their computer screen or while a third party is present. Depending on the contents of the message, the recipient may experience subsequent job loss or, at the very least, significant embarrassment.

Existing techniques for protecting the privacy of messages include keeping message content hidden or minimized until an explicit request is issued to view the message, displaying the message content in garbled form until a recipient interacts with an instant messaging or email program, or forcing the recipient to authenticate before displaying the message. For example, U.S. Publication No. 2003/0023695 describes a system for sending secure messages whereby the recipient, as well as possible third party onlookers, are presented with a visual indicator that the message includes secure content to be retrieved. If the recipient wishes to view the secure content, the message must be authenticated using procedures that are determined by the message sender. Unfortunately, none of the aforementioned prior art techniques are suitable where the message recipient is in the presence of a third party. These techniques are conspicuous, causing the third party to speculate as to why the message recipient is attempting to conceal the contents of the incoming message.

Accordingly, what is needed is a technique for securing display of message content while, at the same time, not providing an indication to any observing third party that a sensitive or private message has been received.

SUMMARY OF THE INVENTION

The shortcomings of the prior art are overcome and additional advantages are provided by securing display of sensitive messages to prevent third parties from viewing sensitive content. For one or more incoming messages designated as sensitive, substitute content to be displayed in place of sensitive content is received from a message recipient. Alternatively or additionally, an indicia to be displayed with any incoming message designated as sensitive is received from the message recipient. A message having sensitive content is designated as sensitive by a sender, a recipient, or an intermediate system. Upon receipt of a message designated as sensitive, a message window is displayed that includes substitute content different from the sensitive content. The substitute content includes an indicia that the sensitive content is not displayed.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution wherein, upon receipt of a message designated as sensitive and including original content, a message window is displayed that includes substitute content different from the original content. The substitute content includes an indicia that the original content is not displayed.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

Like reference numerals are used to refer to like elements throughout the drawings. The detailed description explains the preferred embodiments of the invention, together with advantages and features, by way of example with reference to the drawings.

DETAILED DESCRIPTION OF THE INVENTION

Figure 1:
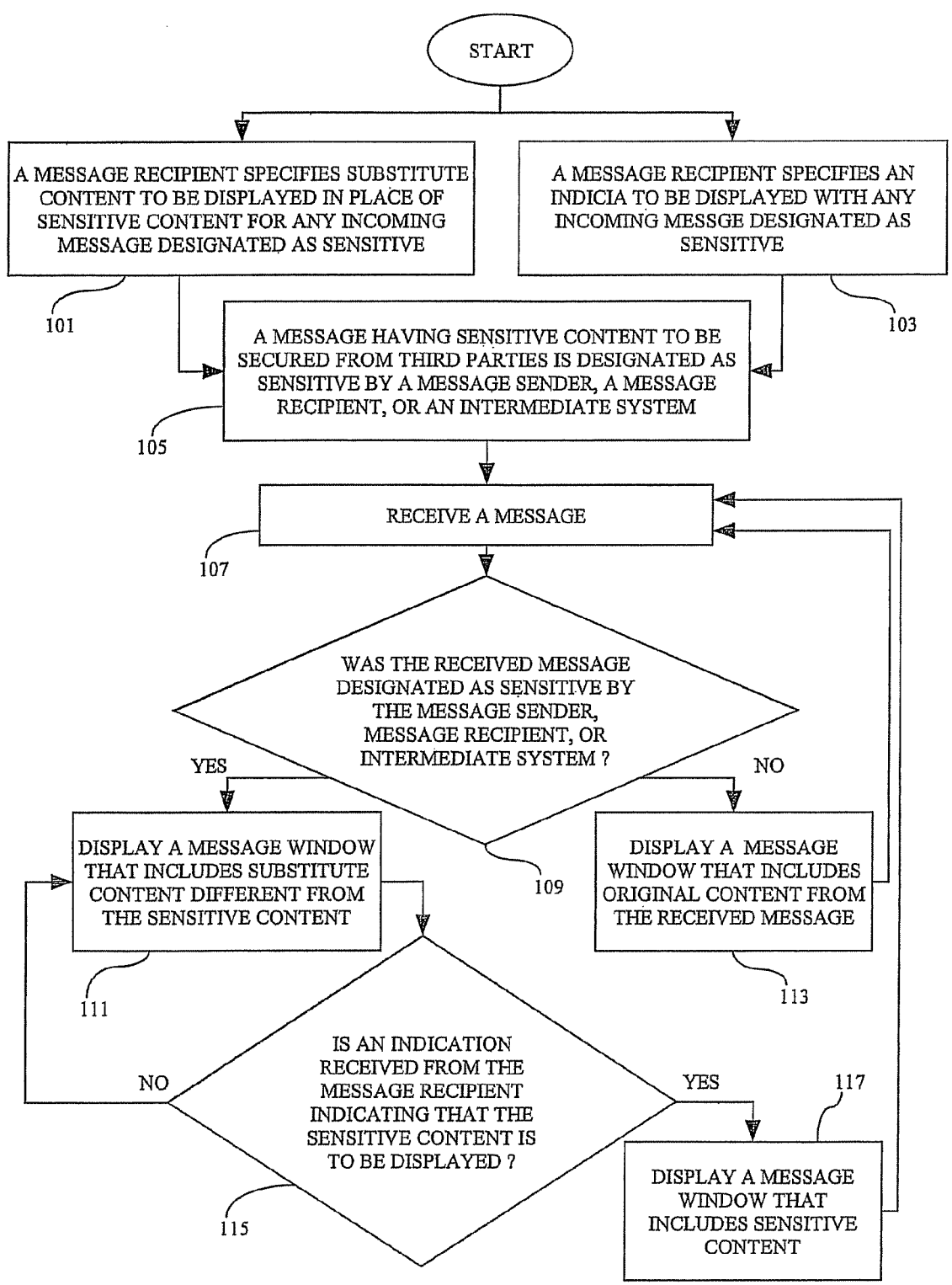
FIG. 1 illustrates an exemplary method for securing display of sensitive messages received from third parties.

FIG. 1 illustrates an exemplary method for securing display of sensitive messages received from third parties. These messages may include instant messages, email messages, other types of electronic messages, or various combinations thereof. The procedure commences at block 101 or block 103. Only one block of blocks 101 and 103 may be performed, or blocks 101 and 103 may both be performed. If blocks 101 and 103 are both performed, these blocks can be performed substantially simultaneously or in any sequence.

At block 101, a message recipient specifies substitute content to be displayed in place of sensitive content for any incoming message designated as sensitive. Illustratively, the recipient specifies substitute content that is not readily discernable as such by potential third party observers. The substitute content may, but need not, be selected in accordance with the recipient's immediate surroundings and may, but need not, represent a phrase or sentence that would be innocuous, irrelevant, trivial, vague, or meaningless to third party observers. For example, if the recipient is working in a large office complex, the recipient may specify substitute content such as "Where is Charlie's office located?", "I can't find that invoice", or "How is your project coming along?". These phrases would be unlikely to arouse the attention of onlookers in an office environment. On the other hand, if the recipient is working at home, the recipient may specify different substitute content such as "How about those Yankees?" or "The Beerworth Proposal needs more work" so as to not arouse the attention of family members.

At block 103, a message recipient specifies an indicia to be displayed with any incoming message designated as sensitive. Illustratively, the recipient specifies an indicia that is not readily discernible as such by potential third party observers. For example, using an indicia in the form of a pop-up window with a bright red background might be too conspicuous in many real-world situations, as would displaying a message in the form of random characters or symbols. Adopting either of these examples, an onlooker would readily discern that a recipient is receiving a sensitive message. On the other hand, italicizing one or more characters or punctuation marks of a displayed message, displaying the message using a different font or font size, or transposing two letters in a word, all represent suitable indicia to be displayed with any incoming message designated as sensitive.

At block 105, a message having sensitive content to be secured from third parties is designated as sensitive by a message sender, a message recipient, or an intermediate system. For example, a message recipient could specify that all messages originating from a specific email address or instant messaging screen name be designated as sensitive, or an intermediate system such as an email server at an internet service provider can designate some or all messages processed by the intermediate system as sensitive. Next, at block 107, an incoming electronic message is received. This message may represent, for example, an email message, an instant message, another type of electronic message, or any of various combinations thereof.

A test is performed at block 109 to ascertain whether or not the received message was designated as sensitive by at least one of the message sender, the message recipient, or an intermediate system. If not, the procedure progresses to block 113 where a message window is displayed that includes original content from the received message. The procedure then loops back to block 107. The affirmative branch from block 109 leads to block 111 where a message window is displayed that includes substitute content different from the sensitive content. If block 101 was previously performed, this substitute content was specified by the message recipient. Otherwise, substitute content may be automatically generated or retrieved for display at block 111.

The procedure advances to block 115 where a test is performed to ascertain whether or not an indication is received from the message recipient indicating that the sensitive content is to be displayed. This indication may be received in the form of the message recipient clicking on one or more characters of the message window containing substitute content, highlighting one or more characters of the message window, entering a predetermined key sequence, right-clicking to cause a pop-up menu to appear with an option "display original message", or performing another action. If an indication is not received, the procedure loops back to block 111. The affirmative branch from block 115 leads to block 117 where a message window is displayed that includes the sensitive content as present in the received incoming electronic message. The procedure then loops back to block 107.

Figure 2A:
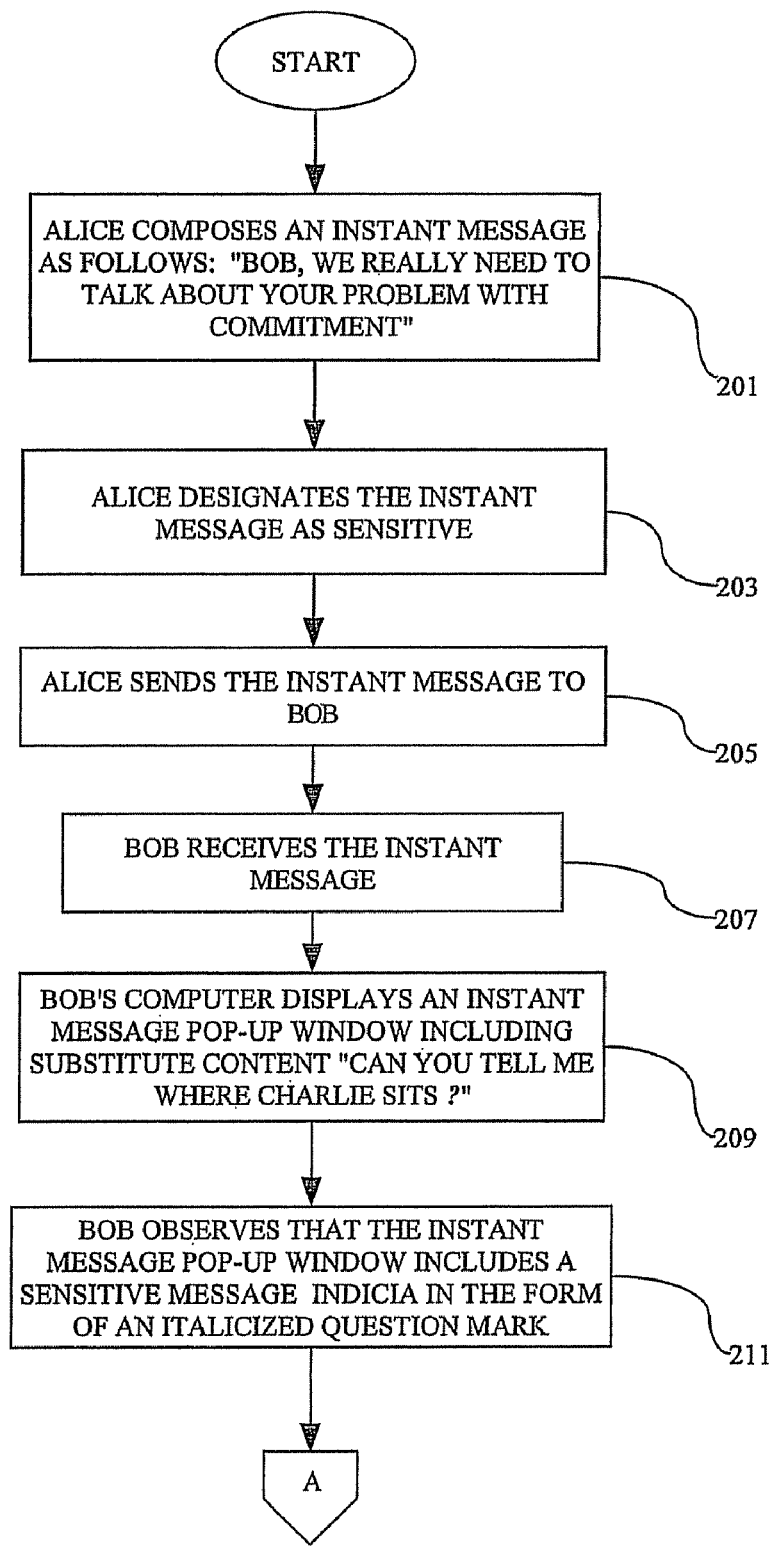
FIGS. 2A and 2B set forth an illustrative example by which display of sensitive information is secured using the procedures of FIG. 1.
Figure 2B:
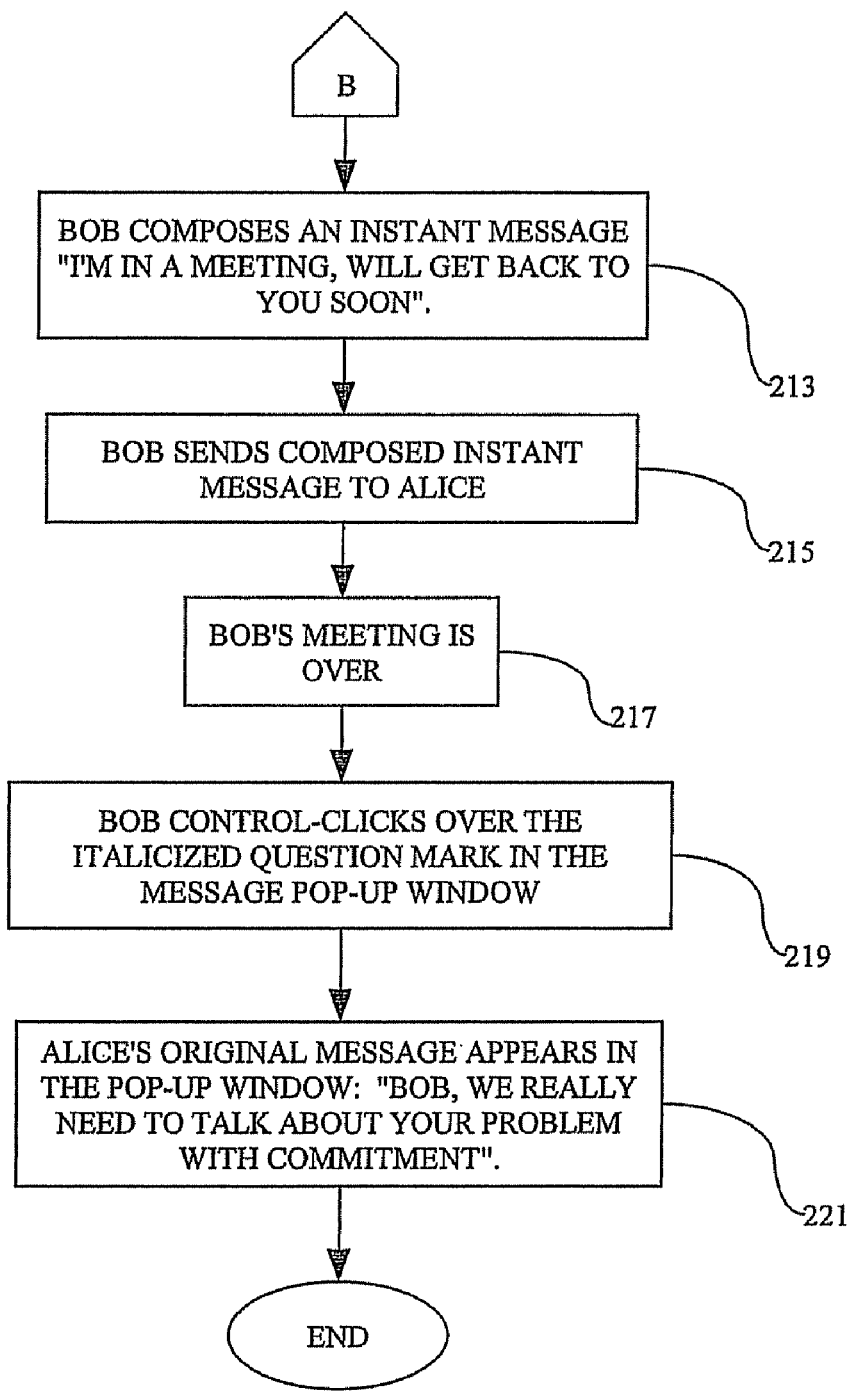

FIGS. 2A and 2B set forth an illustrative example by which display of sensitive information is secured using the procedures of FIG. 1. The example commences at block 201 where Alice composes an instant message as follows: "Bob, we really need to talk about your problem with commitment". Assume that Bob has been engaged to Alice for the past five years with no wedding date planned. Further assume that Bob is working in a busy office environment presently surrounded by several co-workers gazing at a presentation on Bob's computer screen. If these co-workers were to view Alice's instant message to Bob, this would cause Bob much embarrassment and might even lead to Bob's unemployment.

At block 203, Alice designates her instant message as including sensitive content. Next, Alice sends the instant message to Bob (block 205). Bob receives Alice's instant message (block 207). However, using the approach described in connection with FIG. 1, Bob's computer screen displays an instant message pop-up window including substitute content "Can you tell me where Charlie sits?" (block 209). Bob observes that the instant message pop-up window includes a sensitive message indicia in the form of an italicized question mark (block 211). Accordingly, Bob composes an instant message response: "I'm in a meeting, will get back to you soon" (block 213). Bob sends the composed instant message to Alice (block 215).

After some time has elapsed, Bob's meeting is finally over and Bob's co-workers return to their respective offices (block 217). Bob control-clicks over the italicized question mark in the message pop-up window (block 219). Alice's original message appears in the pop-up window: "Bob, we really need to talk about your problem with commitment" (block 221).

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The diagrams depicted herein present illustrative examples. There may be many variations to these diagrams or the steps (or operations) described therein without departing from the spirit and scope of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for securing display of sensitive electronic messages to prevent third parties from viewing sensitive content, the method comprising:

receiving substitute content from a message recipient to be displayed in place of sensitive content for any incoming message designated as sensitive or, alternatively or additionally, receiving an indicia from the message recipient to be displayed with any incoming message designated as sensitive, wherein the substitute content is related to a surrounding environment of the message recipient and is unrelated to the sensitive content;

designating a message as including sensitive content, wherein the designating is performed by at least one of a message sender, the message recipient and an intermediate system, wherein messages originating from at least one of a specific email address and an instant messaging screen name are designated as sensitive, and wherein the intermediate messaging system automatically designates the messages originating from at least one of the specific email address and the instant messaging screen as sensitive; and upon receipt of a message designated as including sensitive content, displaying a message window that includes substitute content different from the sensitive content, wherein the substitute content includes an indicia that the sensitive content is not displayed, wherein if the indicia is alternatively received, the indicia is part of the sensitive content and indicates that the message includes sensitive content, wherein if the indicia is additionally received, the indicia part of the sensitive content, indicates that the message includes sensitive content and is included in the message after the substitute content is received.

2. The method of claim 1 further including automatically generating the substitute content.

3. The method of claim 1 further including receiving an indication from the message recipient and, in response thereto, replacing the substitute content with the sensitive content.

4. The method of claim 3 wherein the indication comprises clicking on one or more characters of the message window.

5. The method of claim 3 wherein the indication comprises highlighting one or more characters of the message window.

6. The method of claim 3 wherein the indication comprises entering a predetermined key sequence.

7. The method of claim 3 wherein the indication comprises right-clicking a pointing device to cause a pop-up menu to appear with an option "display original message".

8. A computer program product for securing display of electronic messages to prevent third parties from viewing sensitive content, the computer program product comprising a non-transitory storage medium readable by a processing circuit and storing instructions for execution by the processing circuit for facilitating a method comprising:

receiving substitute content from a message recipient to be displayed in place of sensitive content for any incoming message designated as sensitive or, alternatively or additionally, receiving an indicia from the message recipient to be displayed with any incoming message designated as sensitive, wherein the substitute content is related to a surrounding environment of the message recipient, and is unrelated to the sensitive content;

designating a message as including sensitive content, wherein the designating is performed by at least one of a message sender, the message recipient and an intermediate system, wherein messages originating from at least one of a specific email address and an instant messaging screen name are designated as sensitive, and wherein the intermediate messaging system automatically designates the messages originating from at least one of the specific email address and the instant messaging screen as sensitive; and upon receipt of a message designated as including sensitive content, displaying a message window that includes substitute content different from the sensitive content, wherein the substitute content includes an indicia that the sensitive content is not displayed, wherein if the indicia is alternatively received, the indicia is part of the sensitive content and indicates that the message includes sensitive content, wherein if the indicia is additionally received, the indicia part of the sensitive content, indicates that the message includes sensitive content and is included in the message after the substitute content is received.

9. The computer program product of claim 8 further including instructions for automatically generating the substitute content.

10. The computer program product of claim 8 further including instructions for receiving an indication from the message recipient and, in response thereto, replacing the substitute content with the sensitive content.

11. The computer program product of claim 10 wherein the indication comprises clicking on one or more characters of the message window.

12. The computer program product of claim 10 wherein the indication comprises highlighting one or more characters of the message window.

13. The computer program product of claim 10 wherein the indication comprises entering a predetermined key sequence.

14. The computer program product of claim 10 wherein the indication comprises right-clicking a pointing device to cause a pop-up menu to appear with an option "display original message".

* * * * *